United States Patent
Roemer

(10) Patent No.: US 8,933,992 B2
(45) Date of Patent: Jan. 13, 2015

(54) DEVICE FOR RECORDING, REMOTELY TRANSMITTING AND REPRODUCING THREE-DIMENSIONAL IMAGES

(75) Inventor: Stefanus Roemer, Hennef (DE)

(73) Assignee: Deutsche Telekom AG, Bonn (DE)

( * ) Notice: Subject to any disclaimer, the term of this patent is extended or adjusted under 35 U.S.C. 154(b) by 544 days.

(21) Appl. No.: 13/129,072

(22) PCT Filed: Mar. 12, 2010

(86) PCT No.: PCT/EP2010/001591
§ 371 (c)(1),
(2), (4) Date: May 27, 2011

(87) PCT Pub. No.: WO2010/102838
PCT Pub. Date: Sep. 16, 2010

(65) Prior Publication Data
US 2011/0249097 A1    Oct. 13, 2011

(30) Foreign Application Priority Data
Mar. 13, 2009  (DE) .......................... 10 2009 012 664

(51) Int. Cl.
*H04N 13/02*    (2006.01)
*H04N 13/04*    (2006.01)

(52) U.S. Cl.
CPC ................................ *H04N 13/0488* (2013.01)
USPC .. 348/46; 348/51; 348/E13.074; 348/E13.026

(58) Field of Classification Search
CPC ............................... H04N 13/02; H04N 13/04
USPC ....................... 348/46, 51, E13.026, E13.074
See application file for complete search history.

(56) References Cited

U.S. PATENT DOCUMENTS

| 2,174,003 | A | * | 9/1939 | Ives | ................................ | 396/330 |
| 3,647,284 | A | * | 3/1972 | Elings et al. | .................. | 359/858 |

(Continued)

FOREIGN PATENT DOCUMENTS

| JP | 8149355 A | 6/1996 |
| JP | 233151 A | 9/2007 |

*Primary Examiner* — Christopher S Kelley
*Assistant Examiner* — Deirdre Beasley
(74) *Attorney, Agent, or Firm* — Andrew Wilford

(57) ABSTRACT

The invention relates to an image recording device, an image reproduction device and a system with such a recording and reproduction device. The recording device comprises an optical axis (1) and a concave mirror (10), whereas through the use of said concave mirror (10) an image of an object (12) can be generated through reflection, the object being located at or projected onto the optical axis (1) near the focal point (11) of the concave mirror (10). A flat light scanner surface (17) is disposed between the concave mirror (10) and the object (12) such that the light beams (15, 16) reflected by the concave mirror (10) generate a two-dimensional projection of the object (12) on the light scanner surface (17), whereas the light scanner surface (17) comprises light receptors (19) through which the incident light beams (15, 16) of the two-dimensional projection can be captured in relation to their frequency and/or phase and/or magnitude, whereas means are provided through which the captured two-dimensional projection can be encoded in an electronic file. Furthermore, the reproduction device comprises a flat projection surface (27) for displaying a two-dimensional graphic, the projection surface being disposed between a concave mirror (20) and a three-dimensional projection (22) to be generated of an object (12). Means are provided for decoding the electronic file and for causing the graphic to be displayed on the projection surface (27) according to the frequency and/or phase and/or magnitude information about light beams encoded in the electronic file. Through the use of said mirror (20) a three-dimensional projection (22) of the object (12) can be generated through reflection of the light beams (25, 26) emitted from the projection surface (27).

27 Claims, 2 Drawing Sheets

(56) References Cited

U.S. PATENT DOCUMENTS

| | | | |
|---|---|---|---|
| 4,571,041 A * | 2/1986 | Gaudyn | 353/10 |
| 4,756,601 A * | 7/1988 | Schroder | 359/472 |
| 5,121,227 A * | 6/1992 | Fisher et al. | 359/1 |
| 5,428,447 A * | 6/1995 | Toida | 356/601 |
| 6,315,416 B1 * | 11/2001 | Dominguez-Montes et al. | 353/99 |
| 6,478,432 B1 * | 11/2002 | Dyner | 359/858 |
| 7,136,031 B2 * | 11/2006 | Lee et al. | 345/32 |
| 7,486,325 B2 * | 2/2009 | Kondo et al. | 348/335 |
| 2003/0039000 A1 * | 2/2003 | Tanaka et al. | 359/22 |
| 2004/0032649 A1 * | 2/2004 | Kondo et al. | 359/364 |
| 2004/0264931 A1 * | 12/2004 | Nakashika et al. | 386/95 |
| 2006/0152784 A1 * | 7/2006 | Usami | 359/28 |
| 2006/0182154 A1 * | 8/2006 | Tanaka et al. | 372/9 |
| 2006/0244907 A1 * | 11/2006 | Simmons | 351/162 |
| 2007/0087284 A1 * | 4/2007 | Fleming et al. | 430/269 |
| 2008/0170486 A1 * | 7/2008 | Sato et al. | 369/112.05 |
| 2008/0170806 A1 * | 7/2008 | Kim | 382/285 |
| 2008/0252977 A1 * | 10/2008 | Iwamoto et al. | 359/559 |
| 2009/0167927 A1 * | 7/2009 | Kusaka | 348/345 |
| 2011/0032325 A1 * | 2/2011 | Harris | 348/36 |
| 2011/0134497 A1 * | 6/2011 | Horimai | 359/11 |
| 2011/0144505 A1 * | 6/2011 | Yamamoto et al. | 600/476 |
| 2011/0249097 A1 * | 10/2011 | Roemer | 348/46 |

* cited by examiner

DEVICE FOR RECORDING, REMOTELY TRANSMITTING AND REPRODUCING THREE-DIMENSIONAL IMAGES

CROSS REFERENCE TO RELATED APPLICATIONS

This application is the US national stage of PCT application PCT/EP2010/001591, filed 12 Mar. 2010, published 16 Sep. 2010 as 2010/102838, and claiming the priority of German patent application 102009012664.3 itself filed 13 Mar. 2009.

FIELD OF THE INVENTION

The invention relates to a recording device for recording an image of an object, the device having an optical axis and a concave mirror formed by rotating a curve about the optical axis. With the concave mirror, an image of an object located at or projected onto the optical axis near the focal point of the concave mirror is or can be generated by reflection.

The invention further relates to a reproduction device for reproducing an image of a three-dimensional object, the device comprising a flat projection surface for displaying a two-dimensional graphic and means for decoding an electronic file and for causing the graphic to be displayed on the projection surface.

The invention further relates to a system comprising a recording device and a reproduction device according to the invention, and a mobile radio terminal device comprising a recording device and/or a reproduction device according to the invention.

BACKGROUND OF THE INVENTION

Known from U.S. Pat. No. 3,647,284 is an optical apparatus comprising two concave mirrors for generating a three-dimensional reproduction of an object by disposing two parabolic mirrors in opposing fashion. In the process, a three-dimensional image is generated with the aid of two parabolic mirrors superimposed one on top of the other. The mirrors lie atop one another in such a way that the focal points of both mirrors are located exactly in the apex of the respective opposing mirror.

The disadvantage of this arrangement is that the mirrors must be directly opposite one another, and thus it is not possible to generate and depict a three-dimensional image at an arbitrary location.

OBJECT OF THE INVENTION

The object of the invention is to provide a recording device, a reproduction device and a system for generating and depicting a three-dimensional image of an object at an arbitrary location.

SUMMARY OF THE INVENTION

This object is accomplished according to the invention in that a flat light scanner surface is disposed between the concave mirror and the object such that light beams reflected by the concave mirror generate a two-dimensional projection of the object on the light scanner surface, the light scanner surface comprising light receptors that capture the incident light beams (15, 16) of the two-dimensional projection in relation to their frequency and/or phase and/or magnitude, means being provided that can encode the captured two-dimensional projection in an electronic file.

The advantage of the invention is that a three-dimensional image of an object can be transmitted over an arbitrary distance and can be reproduced at arbitrary locations. Possible fields of application include three-dimensional video telephony, virtual worlds, etc.

What is particularly advantageous in the recording device for recording an image of an object, where the device has an optical axis and a concave mirror formed by rotating a curve about the optical axis, and with the mirror an image of an object that is located at or projected onto the optical axis near the focal point of the concave mirror is or can be generated through reflection on a flat light scanner surface is between the concave mirror and the object such that the light beams reflected by the concave mirror generate a two-dimensional projection of the object on the light scanner surface, the light scanner surface comprising light receptors through which the incident light beams of the two-dimensional projection can be captured/are captured in relation to their frequency and/or phase and/or magnitude, whereas means are provided through which the captured two-dimensional projection is encoded/can be encoded in an electronic file.

Encoding in an electronic file is understood in particular to mean the generation of a graphic file on the basis of frequency and/or phase and/or magnitude information of incident light beams, in other words the conversion to a vector graphic or a pixel graphic, for example.

Preferably, the concave mirror is a parabolic mirror. Such a parabolic mirror is described by a parabola that is rotated about the optical axis, and is characterized in that it has a defined focal point with the optical property that parallel incoming beams are reflected to the focal point in convergent fashion or that beams originating from the focal point are reflected out in substantial parallel fashion similar to vehicle headlights.

In an advantageous embodiment of the recording device, the geometric form of the concave mirror, in particular the parabolic mirror, can be at least minimally altered, i.e. the parabolic mirror can be adjusted in its shape such that the parabola which describes the cross section of the mirror can be slightly compressed or stretched. This can be accomplished by forming the parabolic mirror from an at least minimally elastic material, for example a silicone, wherein the concave inside of the mirror is coated with a reflecting material. A means for exerting a tension or pressure force on the mirror can be provided on the convex rear side thereof so that the mirror can be correspondingly stretched or compressed. The change in the parabolic shape of the mirror has the advantage in that the focal point of the mirror can be adjusted, or is adjustable at least within a comparatively small range. This allows the object to be focused, in other words the sharpness of its image to be adjusted.

Preferably, means can be provided for automatically correcting the focal point, in other words for moving the focal point to the geometric location of the object or of the projection thereof by changing the parabolic shape of the mirror along the optical axis thereof. In the process, the means can comprise a measuring device that determines the distance of the object to the recording device. The means can also comprise a control unit that processes the distance measurement and automatically makes an adjustment to the parabolic shape of the mirror.

Preferably, the light scanner surface is perpendicular to the optical axis. Such a flat configuration and/or alignment perpendicular to the optical axis of the scanner surface or recording surface forming the light scanner surface allows distortions to be avoided.

Preferably, the light scanner surface has an opening that is concentric to the optical axis. In particular, the concentric opening can be covered, i.e. sealed, by a transparent film or disk or the like. This protects the device from the penetration of dirt.

In an advantageous manner, means for changing the diameter of the opening can be provided for the light scanner surface. This allows a focusing of the object. For example, an iris aperture can be used for this purpose, similar to those known from optics and in photography. The opening can be manually or automatically adjusted. In particular, the means can be adapted to automatically adjust the width, i.e. the diameter, and thus the sharpness of projection of the object. For example, for the purposes of automatic focus adjustment the digitized projection on the light scanner surface can be analyzed and a value for the sharpness of the projection can be obtained, whereupon the opening can be adjusted based on this value in order to increase the sharpness.

In a preferred embodiment, the focal length of the concave mirror or parabolic mirror is larger than the distance between the mirror and the light scanner surface along the optical axis. This results in larger degrees of freedom with regard to the structuring of the geometric relationships with respect to the size of the object to be imaged and with respect to the sharpness, i.e. the quality of the recording or image.

A lens system can be provided, by means of which a virtual image of the object can be projected or is projected onto the optical axis, in particular onto the focal point or near the focal point of the concave mirror.

In an advantageous improvement of the recording device, the device can comprise means for adjusting the lens system such that the virtual image of the object is projected precisely onto the focal point or near the focal point of the concave mirror. This can be achieved by moving at least one lens of the lens system along the optical axis nearer to the object or nearer to the concave mirror.

Preferably, the light scanner surface has light receptors spaced equidistantly. The information about frequency and/or phase and/or magnitude of the incident light beams is taken at every light receptor. A light receptor is a sensor forming a sampling point or a sensor pixel of the light scanner surface.

Preferably, in the recording device a storage medium is provided for storing the encoded electronic file.

In a preferred embodiment, the recording device has means for transmitting the encoded electronic file to a receiver, in particular over a network. The recording device can thus be designed as a stand-alone unit, for example in a housing similar to a so-called webcam, or in a mobile radio terminal as in a mobile telephone, and can be incorporated into a network such as the Internet, a mobile radio network or the like, and can record individual images or video sequences or continuous video recordings, encode them digitally and transmit them over a network to a receiver for reproduction. Alternatively or in addition thereto, storage in the form of electronic image files or video files or the like is possible for the purposes of further processing or later reproduction.

What is especially advantageous in the reproduction device according to the invention for reproducing an image of a three-dimensional object, wherein the device has a flat projection surface for displaying a two-dimensional graphic and wherein means are provided for decoding an electronic file and for causing the graphic to be displayed on the projection surface according to the frequency and/or phase and/or magnitude information about light beams encoded in the electronic file, is the fact that the projection surface to be between a concave mirror and a three-dimensional projection to be generated of an object, the concave mirror being formed by rotating a curve about an optical axis, through the use of the mirror a three-dimensional projection of the object lying on the optical axis near the focal point of the concave mirror is generated/can be generated through reflection of the light beams emitted from the projection surface.

Preferably, the concave mirror is a parabolic mirror that is designed identical to the mirror described for the recording device. The light beams emitted from the projection surface may be substantially parallel.

Preferably, the projection surface is perpendicular to the optical axis. Such a flat configuration and/or alignment perpendicular to the optical axis of the projection surface, i.e. the surface that displays the two-dimensional image, allows distortions in the reproduction of the three-dimensional image of the object to be avoided.

Preferably, the projection surface of the reproduction device has an opening that is concentric to the optical axis. In particular the concentric opening can be covered, i.e. sealed, by a transparent film or disk or the like. This protects the device from the penetration of dirt. The projection surface can also comprise means for changing the diameter of the opening, the means being designed identical to those that the light scanner surface has for changing the diameter of the opening thereof. Also, means for manually or automatically adjusting the opening of the projection surface can be the same means used for the opening of the light scanner surface.

Especially preferred is to make the focal length of the concave mirror or parabolic mirror larger than the distance between the mirror and the projection surface along the optical axis.

This again results in larger degrees of freedom with regard to the structuring of the geometric relationships with respect to the size of the object to be imaged and with respect to the sharpness, i.e. the quality of the image. In particular, it is possible to displace the focal point of the parabolic mirror not within the intermediate space between the mirror and the projection surface, but outward so that the produced three-dimensional representation of the object is easily viewed by the observer from the outside.

Preferably, the projection surface of the reproduction device has light emitters that are spaced equidistantly and/or evenly distributed.

It is especially preferred for the projection surface of the reproduction device to comprise light emitters, in particular those spaced equidistantly, that radiate light perpendicular to the projection surface with low scatter, wherein the light emitters are lasers in particular since lasers can emit very focused beams of various colors in the visible range.

Preferably provided in the reproduction device is a storage medium for storing an electronic file, in particular as a digitization of a graphic, a video sequence or the like.

In connection with the invention, the terms file or graphic file mean a digitized image, but can equally mean a digitized video sequence or the like as well. The invention is not limited to the recording, transmission and reproduction of stationary images, but is also suitable for recording, transmitting and reproducing any three-dimensional objects, persons, etc. as a stationary image or as a video.

Preferably provided in the reproduction device are means for receiving an electronic file, in particular as a digitization of a graphic, and/or of a video sequence, in particular over a network.

In the recording and reproduction system for recording and reproducing an image of a three-dimensional object, a recording device and a reproduction device are provided according to the invention, the devices being of the type described above.

The concave mirrors of both the recording device and the reproduction device of the recording and reproduction system are preferred to be parabolic mirrors as is described above, in particular parabolic mirrors of identical focal lengths.

Alternatively, mirrors or parabolic mirrors of different focal lengths can be provided. Through appropriate selection and combination, magnification or shrinking of the images of the object is possible.

Preferably, in the recording and reproduction system the distance from the concave mirror to the light scanner surface along the optical axis of the recording device is equal to the distance from the concave mirror to the projection surface along the optical axis of the reproduction device.

The quality of the depicted image can be affected in numerous ways by altering the arrangement of the mirror relative to the scan surface (projection surface of the recording device) and to the display surface (projection surface of the reproduction device), selecting identical or different focal lengths, changing the focal lengths by modifying the shape of the mirror, adjusting at least one lens of the lens system, changing the opening width of the openings of the scanner and/or display surface and/or electronically editing the image files. In particular, magnifications, shrinking, distortions, compressions or stretching can be produced, so that a wide variety of optical effects can be produced and image corrections can be made mechanically or digitally.

Thus, the invention provides a method and corresponding devices for recording, remotely transmitting and reproducing three-dimensional images.

In the process, through the use of a parabolic mirror or concave mirror on the transmitter side, a two-dimensional image of an object located on the optical axis or at the focal point of the mirror, or of an object whose three-dimensional image is projected to the focal point of the mirror, is projected onto a flat scanner plate perpendicular to the axis of rotation of the parabolic mirror, the plate comprising an opening concentric to the axis of rotation, being evenly populated with equidistant light receptors in the visible frequency range and performing a digital encoding of the two-dimensional projection.

This encoding of the two-dimensional projection is transmitted over a digital transmission network such as a telephone connection, a mobile phone network or a computer network such as the Internet, to a receiver which operates a projection plate evenly populated with equidistant light emitters in the visible frequency range. The plate is operated according to the encoding in such a way that a sufficiently precise reproduction of the two-dimensional projection of the transmitting side is achieved.

On the receiver side, a three-dimensional image of the object is generated from the two-dimensional projection using a parabolic mirror or concave mirror with the same or with a different focal length than that on the transmitter side, the axis of rotation of the mirror being perpendicular to the projection plate in the direction of the emitted light, wherein the projection plate preferably has an opening concentric to the axis of rotation.

The spacings between the light receptors on the transmitter side and of the light emitters on the receiver side must be selected such that a sufficiently precise three-dimensional image of the object results on the receiver side. In the process, the following applies: the smaller the distances, the higher the precision of the three-dimensional image.

In the process, the concentric opening of the scanner plate (light scanner surface) and of the projection plate (projection surface) must be selected such that a sufficiently sharp three-dimensional image results on the receiver side. In the process, the following applies: the smaller the opening, the sharper the image.

The light emitters must be adapted such that the light emitted therefrom has a sufficiently low degree of scattering and is only emitted perpendicular to the projection plate. Lasers in particular can be used here since they meet the stated requirements and can generate various colors in the visible range.

The method according to the invention and the corresponding devices provide for the recording, remote transmission and reproduction of three-dimensional images.

With the aid of a parabolic or a concave mirror, a two-dimensional projection of an object is generated. This projection is encoded and transmitted to a location at an arbitrary distance. There, this projection is reproduced from the encoding and is converged using a parabolic or concave mirror to form a three-dimensional image of the object.

The invention is based on the property of a parabolic mirror or concave mirror of reflecting incident rays in such a way that they converge at a point, the focal point. Vice versa, rays that are emitted from the focal point are reflected such that the reflected rays run parallel to the axis of rotation of the mirror. If two identical parabolic mirrors are now placed onto one another in such a way that the focal point of one mirror coincides with the apex of the other mirror, a sufficiently small object in the apex of one mirror is double-reflected such that a three-dimensional image of the object arises at the apex of the other mirror.

The core of the invention is that the two parabolic mirrors can now be spatially separated from one another using the method according to the invention such that the three-dimensional image of the object can be generated at a location of arbitrary distance. Known methods for recording and encoding and for transmitting two-dimensional images can be used for this purpose.

For example, the recording device according to the invention and/or the reproduction device according to the invention can be integrated into a mobile telephone so that a digital, three-dimensional image of an object can be recorded at one location using a mobile telephone comprising a recording device. The image can then be transmitted as a file over a mobile radio communication network to another mobile telephone comprising a reproduction device at another location, and the image can be displayed there using the reproduction device. Also, to be able to utilize both functionalities, namely recording and reproduction, a mobile telephone can comprise both a recording and a reproduction device.

The method functions as follows: using a parabolic mirror, a two-dimensional image of a sufficiently small object located at the focal point of the parabolic mirror of the recording device is projected onto a flat scanner plate perpendicular to the axis of rotation of the parabolic mirror. The two-dimensional projection is encoded using known methods, for example, and transmitted to a location at an arbitrary distance. There, the two-dimensional projection is reproduced with sufficient precision using a light-generating projection plate. In the process, light rays must be generated that radiate with sufficient precision parallel to the axis of rotation of a parabolic mirror and in the direction thereof. Through reflection in the parabolic mirror, a three-dimensional image of the object at the transmitter side is generated thereby.

Scanning and encoding methods for two-dimensional images can for example include: JPEG File Interchange Format (JFIF), "ISO/IEC IS 10918-1/ITU-T Recommendation T.81", Windows Bitmap Format, also called Bitmap Image (BMP), GIF, Graphics Interchange Format, or similar encoding methods, in particular for video sequences as well. A transmission method for two-dimensional images can be used for data transmission, such as: Streaming video, or the like. The display on the receiver side, i.e. the reproduction display, can be done using displays for displaying two-dimensional images, such as: VGA, Video Graphics Array, or the like. Also, laser technology for generating unidirectional light at a low level of scatter can be used.

BRIEF DESCRIPTION OF THE DRAWING

An illustrated embodiment of the invention is shown in the figures and is explained below. Shown are.

SPECIFIC DESCRIPTION OF THE INVENTION

Figure 1:
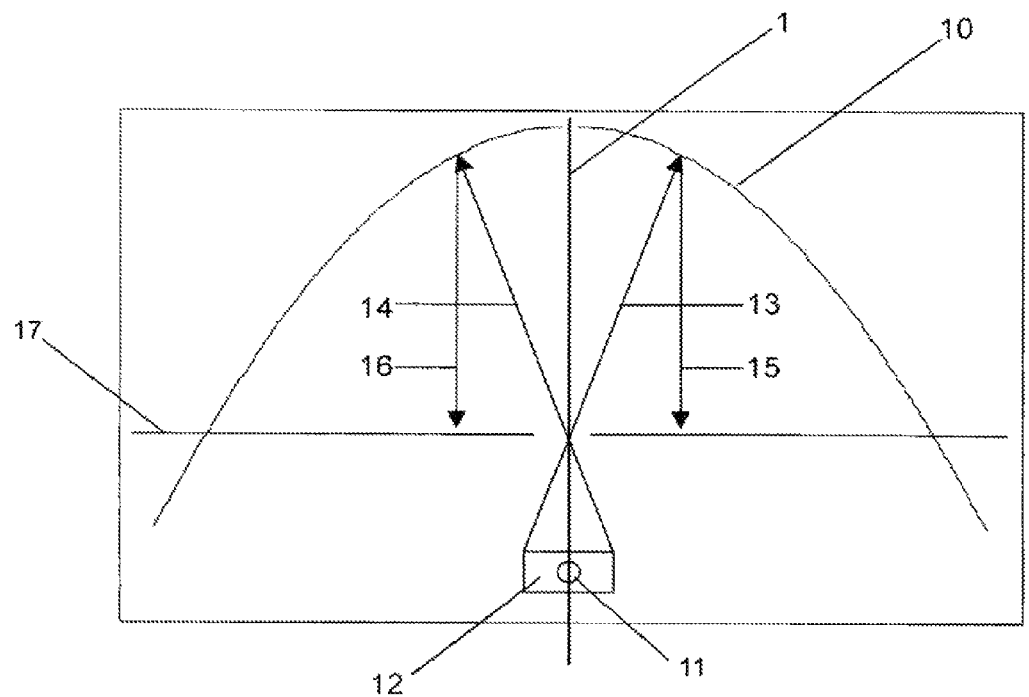
FIG. 1 a recording device in sectional view.
Figure 3:
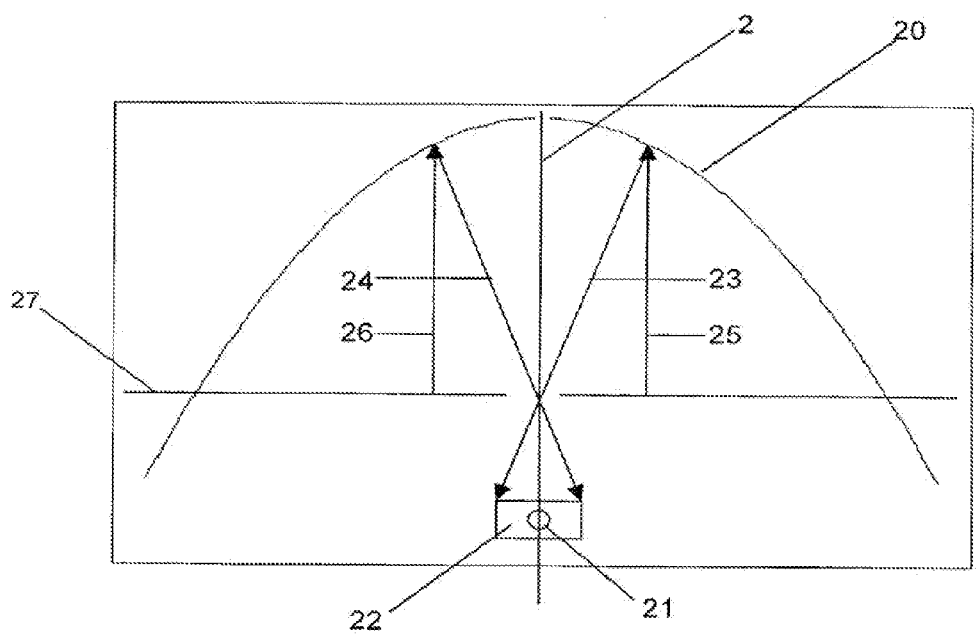
FIG. 3 a reproduction device in sectional view.

According to the invention, the system is made up of the transmitting and the receiving unit according to FIGS. 1 and 3.

On the transmitter side, a two-dimensional image of an object 12 that is located at or near the focal point 11 of the mirror is projected onto a flat scanner plate 17 using a concave mirror, which in the illustrated embodiment shown is a parabolic mirror 10. Alternatively, the three-dimensional image of the object is projected by a lens system to the focal point 11 of the mirror 10.

Due to the optical properties of the parabolic mirror 10, the light beams 13, 14 issuing from the object 12 are reflected by the mirror as parallel beams 15, 16 and are recorded by the light scanner surface 17.

Figure 2:
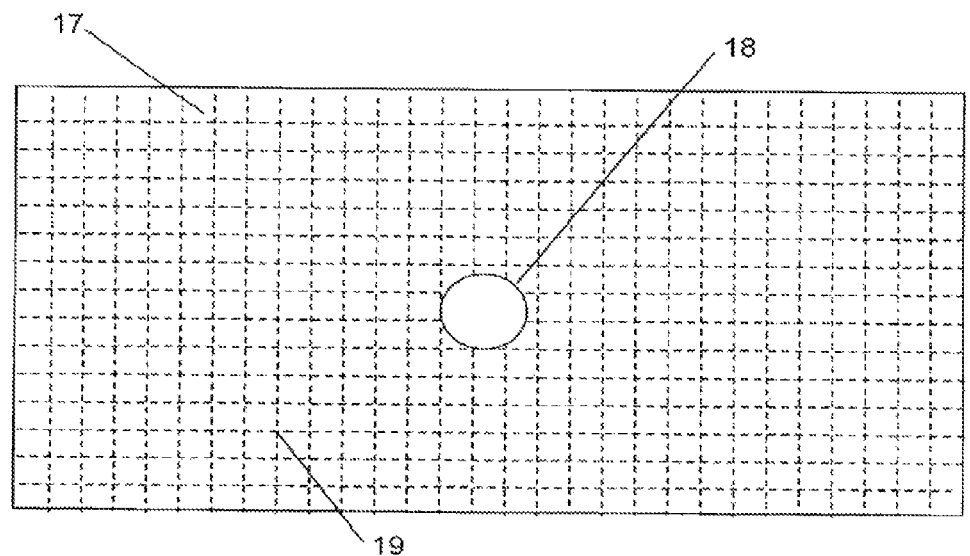
FIG. 2 the scanner or light scanner surface of the recording device according to FIG. 1 in a top view.

The scanner plate or light scanner surface 17 is perpendicular relative to the axis 1 of rotation of the parabolic mirror 10. The axis 1 of rotation forms the optical axis of the parabolic mirror 10. The light scanner surface 17 has an opening that is concentric to the axis 1 of rotation as shown in FIGS. 1 and 2. This makes it possible for the focal point 11 to lie on the outside and to be accessible from the outside in order to place the object 12 near the focal point 11. The scanner surface 17 is evenly populated with equidistant light receptors in the visible frequency range, as shown in FIG. 2. The two-dimensional projection is also digitally encoded.

Figure 4:
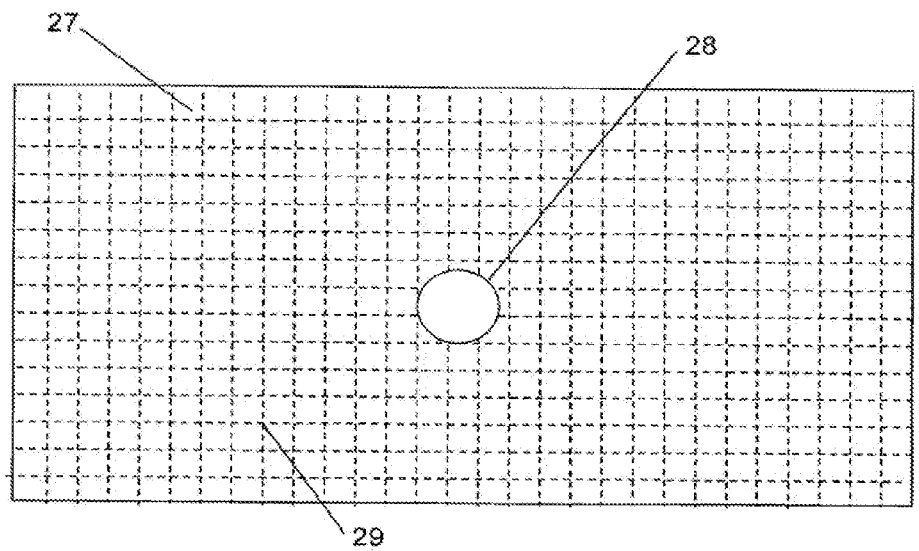
FIG. 4 the projection or display surface of the reproduction device according to FIG. 3 in a top view.

This encoding of the two-dimensional projection is transmitted over a digital transmission network to a receiver according to FIG. 3, which operates a projection plate 27 that is evenly populated with equidistant light emitters 29 in the visible frequency range (a possible embodiment of the projection surface 27 is shown in FIG. 4) in such a way that a sufficiently precise reproduction of the two-dimensional projection on the transmitting side is accomplished.

On the receiving side, a three-dimensional image 22 of the object 12 is generated from the two-dimensional projection using a concave mirror 20, which in the illustrated embodiment shown is a parabolic mirror 20 with the same or a different focal length as the focal length on the transmitting side. The axis 2 of rotation of the mirror 20, which corresponds to the optical axis of the parabolic mirror, is perpendicular to the projection plate 27 in the direction of the emitted light, and the projection plate 27 has an opening 28 that is concentric to the axis 2 of rotation. The projection surface 27 is shown in FIG. 4 in a top view.

The spacings between the light receptors 19 on the transmitter side and of the light emitters 29 on the receiver side must be selected such that a sufficiently precise three-dimensional image 22 of the object 12 results on the receiver side. In the process, the following applies: the smaller the distances, the higher the precision of the three-dimensional image 22.

In the process, the concentric opening 18 of the scanner plate 17 (light scanner surface) and the concentric opening 28 of the projection plate 27 (projection surface) must be selected such that a sufficiently sharp three-dimensional image 22 results on the receiver side. In the process, the following applies: the smaller the opening 18, the sharper the image 22.

The light emitters 29 must be adapted such that the light emitted therefrom has a sufficiently low degree of scattering and is only emitted perpendicular to the projection plate 27. Lasers in particular can be used here since they meet the stated requirements and can generate various colors in the visible range.

FIG. 4 shows the beam path. Due to the optical properties of the parabolic mirror 20, the perpendicular light beams 25, 26 issued from the light emitters 29 of the projector surface 27 are reflected to the focal point 21 of the parabolic mirror 20 and in this way generate the three-dimensional image 22 near the focal point 21. The beams 23, 24 reflected by the mirror 20 are also depicted in FIG. 3. The light emitters 29 thus radiate the beams 25, 26 parallel to the optical axis 2 of the parabolic mirror 20. These beams are made to converge by the mirror 20 at the focal point 21 in the form of beams 23, 24.

Consequently, according to the invention and through the use of a parabolic or concave mirror on the transmitter side, a two-dimensional image of an object 12 located at the focal point 11 of the mirror 10 is projected onto a flat scanner plate 17 perpendicular to the axis 1 of rotation of the parabolic mirror 10, the plate comprising an opening 18 concentric to the axis 1 of rotation according to FIG. 1 and being evenly populated with equidistant light receptors 19 in the visible frequency range as shown in FIG. 2, and performing a digital encoding of the two-dimensional projection.

According to the encoding generated by the transmitting unit, a projection plate 27 evenly populated with equidistant light emitters 29 in the visible frequency range according to FIG. 4 is operated such that a sufficiently precise reproduction of the two-dimensional projection from the transmitting side is achieved, and such that on the receiving side a three-dimensional image 22 of the object 12 is generated from the two-dimensional projection using a parabolic mirror 20 or concave mirror with the same focal length or a different focal length as that on the transmitting side, the axis 2 of rotation of the mirror being perpendicular to the projection plate 27 in the direction of the emitted light, wherein the projection plate 27 has an opening 28 that is concentric to the axis 2 of rotation, as is shown in FIG. 4.

Thus, the invention also makes it possible, through a computer simulation, to calculate a two-dimensional projection of a real object as would appear on the light scanner surface (scanner surface) using the recording device according to FIG. 1 for a real object, and then display this simulated two-dimensional projection using a reproduction device according to FIGS. 3 and 4.

This makes it possible to generate three-dimensional images of virtual objects. This can be utilized to advantageous effect in product development, for example, since three-dimensional images can be generated and evaluated without having to produce a prototype.

The concentric openings 18, 28 of the light scanner plate or scanner plate 17 on the recording side and the display or projection surface 27 on the reproduction side can be covered by a transparent disk or a transparent film or the like in order to prevent dust or dirt from penetrating into the optical device. The quality of the recording and the reproduction could be negatively affected otherwise.

The invention claimed is:

1. A device for recording an image of an object, the device comprising:
    a single concave mirror formed as a surface of revolution centered on an optical axis and having a focal point on the optical axis, an object being located on the optical axis near the focal point;
    a flat light scanner surface between the concave mirror and the object such that light from the object is reflected by the concave mirror and cast directly on the flat light scanner surface as a two-dimensional projection of the object;
    light receptors on the scanner surface that capture incident light of the two-dimensional projection with respect to their frequency or phase or magnitude; and
    means connected to the light receptors for encoding the captured two-dimensional projection in an electronic file.

2. The recording device defined in claim 1, wherein the concave mirror is parabolic such that light from the object is reflected as a multiplicity of parallel beams onto the scanner surface.

3. The recording device defined in claim 1, wherein the concave mirror is made of an elastic material and is at least minimally able to be changed in geometric shape.

4. The recording device defined in claim 1, wherein the light scanner surface is perpendicular to the optical axis.

5. The recording device defined in claim 1, wherein the light scanner surface has an opening concentric to the optical axis and covered by a transparent film or disk.

6. The recording device defined in claim 5, wherein the light scanner surface has means for changing the diameter of the opening for automatically adjusting the sharpness of projection of the object.

7. The recording device defined in claim 1, wherein a focal length of the concave mirror is larger than a spacing between the concave mirror and the light scanner surface along the optical axis.

8. The recording device defined in claim 1, further comprising:
    a lens system that projects a virtual image of the object onto the focal point or near the focal point of the concave mirror.

9. The recording device defined in claim 8, comprises further comprising:
    means for adjusting the lens system such that the virtual image of the object is projected precisely onto or near the focal point of the concave mirror.

10. The recording device defined in claim 1, wherein the light scanner surface has light receptors that are equidistantly spaced.

11. The recording device defined in claim 1, further comprising:
    a storage medium for storing the encoded electronic file as a digitalized graphic or video sequence.

12. The recording device defined in claim 1, further comprising:
    means for transmitting the encoded electronic file to a receiver over a network.

13. A device for reproducing an image of a three-dimensional object, the device comprising:
    a single concave mirror formed as a surface of revolution centered on an optical axis and having a focal point on the optical axis;
    a flat projection surface located between the concave mirror and the focal point of the concave mirror and capable of emitting light directly at the concave mirror; and
    means for decoding an electronic file and for displaying a graphic on the projection surface defined in the frequency or phase or magnitude information about light encoded in the electronic file such that light from the flat projection surface reflected by the concave mirror forms a three-dimensional projection of the graphic on the optical axis near the focal point.

14. The reproduction device defined in claim 13, wherein the concave mirror is parabolic such that light from the object is reflected as a multiplicity of parallel beams onto the scanner surface.

15. The reproduction device defined in claim 13, wherein the projection surface is perpendicular to the optical axis.

16. The reproduction device defined in claim 13, wherein the projection surface has an opening concentric to the optical axis covered by a transparent film or disk.

17. The reproduction device defined in claim 16, wherein the projection surface has means for changing the diameter of the opening for automatically adjusting the sharpness of the projection of the object.

18. The reproduction device defined in claim 13, wherein the focal length of the concave mirror or parabolic mirror is larger than a spacing between the concave mirror and the projection surface along the optical axis.

19. The reproduction device defined in claim 13, wherein the projection surface has light emitters that are equidistantly spaced.

20. The reproduction device defined in claim 13, wherein the projection surface has light emitters equidistantly spaced and that radiate light perpendicular to the projection surface at a low scatter.

21. The reproduction device defined in claim 13, further comprising:
    a storage medium for storing an electronic file as a digitization of a graphic or a video sequence.

22. The reproduction device defined in claim 13, further comprising:
    means for receiving an electronic file as an encoded graphic or a video sequence over a network.

23. In combination with the recording device defined in claim 1, a reproduction device comprising:
    a single concave mirror formed as a surface of revolution centered on an optical axis and having a focal point on the optical axis;
    a flat projection surface located between the concave mirror and the focal point of the concave mirror and capable of emitting light directly at the concave mirror; and
    means for decoding an electronic file and for causing the graphic to be displayed as light emitted from the projection surface defined in the frequency or phase or magnitude information about light encoded in the electronic file such that the concave mirror reflects the light emitted by the flat light scanner surface as a three-dimensional projection of the object lying on the optical axis near the focal point of the concave mirror.

24. The recording and reproduction system defined in claim 23, wherein the concave mirrors of both the recording device and of the reproduction device are parabolic and have the same focal length.

25. The recording and reproduction system defined in claim 23, wherein a spacing from the concave mirror to the light scanner surface along the optical axis of the recording device is equal to the spacing between the concave mirror and the projection surface along the optical axis of the reproduction device.

26. A mobile radio terminal device for telecommunications in a mobile radio communication network, the terminal comprising the recording device defined in claim 1.

27. A mobile radio terminal device for telecommunications in a mobile radio communication network, the terminal comprising the reproduction device defined in claim 13.

\* \* \* \* \*